(12) United States Patent
Sekii et al.

(10) Patent No.: US 8,670,209 B2
(45) Date of Patent: Mar. 11, 2014

(54) SPINDLE MOTOR INCLUDING A FLUID DYNAMIC BEARING AND DISK DRIVE APPARATUS WITH SAME

(71) Applicant: Nidec Corporation, Kyoto (JP)

(72) Inventors: Yoichi Sekii, Kyoto (JP); Shuji Iwasaki, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/767,205

(22) Filed: Feb. 14, 2013

(65) Prior Publication Data

US 2014/0016229 A1    Jan. 16, 2014

(30) Foreign Application Priority Data

Jul. 13, 2012    (JP) ................. 2012-157474

(51) Int. Cl.
*G11B 17/02* (2006.01)
*H02K 7/08* (2006.01)

(52) U.S. Cl.
USPC ......................... 360/99.08; 310/90

(58) Field of Classification Search
USPC ......... 360/99.08, 99.04, 98.07; 310/67 R, 90; 384/107, 114, 123
See application file for complete search history.

(56) References Cited

U.S. PATENT DOCUMENTS

| 5,533,811 | A | 7/1996 | Polch et al. | |
|---|---|---|---|---|
| 5,558,443 | A | 9/1996 | Zang | |
| 6,211,592 | B1 | 4/2001 | Ichiyama | |
| 6,246,136 | B1 | 6/2001 | Ichiyama | |
| 6,831,812 | B2 * | 12/2004 | Sode et al. | 360/99.08 |
| 7,650,697 | B2 * | 1/2010 | Gomyo et al. | 29/898.02 |
| 7,758,246 | B2 * | 7/2010 | Aiello et al. | 384/107 |
| 7,764,000 | B2 * | 7/2010 | Tamaoka | 310/90 |
| 8,107,190 | B2 * | 1/2012 | Ito et al. | 360/99.08 |
| 8,379,345 | B2 * | 2/2013 | Mizukami et al. | 360/99.08 |
| 2004/0090702 | A1 | 5/2004 | Aiello et al. | |
| 2004/0096131 | A1 | 5/2004 | Aiello et al. | |

(Continued)

FOREIGN PATENT DOCUMENTS

| JP | 06-028335 U | 4/1994 |
|---|---|---|
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Brian Miller
(74) *Attorney, Agent, or Firm* — Keating & Bennett, LLP

(57) ABSTRACT

A stationary portion of a motor includes a shaft component, an upper plate portion, and a lower plate portion. A rotating portion includes a sleeve portion which is disposed between the upper plate portion and the lower plate portion. The shaft component includes an inner shaft upper portion, an inner shaft lower portion which is located in a lower side of the inner shaft upper portion, and an outer shaft portion. The outer shaft portion is located on an outer circumferential surface of the inner shaft upper portion and an outer circumferential surface of the inner shaft lower portion. The inner shaft upper portion and the upper plate portion are preferably defined by a single monolithic member, and the inner shaft lower portion and the lower plate portion are preferably defined by a single monolithic member.

20 Claims, 13 Drawing Sheets

(56) References Cited

U.S. PATENT DOCUMENTS

| | | | |
|---|---|---|---|
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |
| 2005/0225187 A1 | 10/2005 | Hafen et al. | |
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |
| 2006/0051001 A1 | 3/2006 | Nishimura et al. | |
| 2006/0210205 A1 | 9/2006 | Engesser et al. | |
| 2006/0222276 A1 | 10/2006 | Uenosono | |
| 2007/0140606 A1 | 6/2007 | Feng et al. | |
| 2007/0154123 A1 | 7/2007 | Gomyo et al. | |
| 2007/0177832 A1 | 8/2007 | Gotoh et al. | |
| 2007/0211971 A1 | 9/2007 | Obara et al. | |
| 2008/0006332 A1 | 1/2008 | Ishizawa et al. | |
| 2008/0056104 A1 | 3/2008 | Nishimura et al. | |
| 2009/0129710 A1 | 5/2009 | Ito et al. | |
| 2009/0140587 A1 | 6/2009 | Popov et al. | |
| 2009/0140588 A1 | 6/2009 | Drautz et al. | |
| 2009/0279818 A1 | 11/2009 | Le et al. | |
| 2010/0085662 A1* | 4/2010 | Gomyo et al. | 360/99.08 |
| 2010/0124387 A1 | 5/2010 | Fuss et al. | |
| 2011/0285232 A1* | 11/2011 | Le et al. | 310/90 |
| 2012/0063030 A1* | 3/2012 | Yamada et al. | 360/99.08 |
| 2013/0128379 A1* | 5/2013 | Mizukami et al. | 360/69 |

FOREIGN PATENT DOCUMENTS

| | | | |
|---|---|---|---|
| JP | 07-336924 A | 12/1995 | |
| JP | 2002-005171 A | 1/2002 | |
| JP | 2003-092867 A | 3/2003 | |
| JP | 2003-244886 A | 8/2003 | |
| JP | 2004-173377 A | 6/2004 | |
| JP | 2005-048890 A | 2/2005 | |
| JP | 2006-226388 A | 8/2006 | |
| JP | 2009-041671 A | 2/2009 | |
| JP | 2009-133361 A | 6/2009 | |
| JP | 2011-002024 A | 1/2011 | |
| WO | 2006/120719 A1 | 11/2006 | |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Fukushima, "Motor and Disk Drive Apparatus," U.S. Appl. 13/751,380, filed Jan. 28, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii, "Motor and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.

* cited by examiner

SPINDLE MOTOR INCLUDING A FLUID DYNAMIC BEARING AND DISK DRIVE APPARATUS WITH SAME

BACKGROUND OF THE INVENTION

1. Field of the Invention

The present invention relates to an electric spindle motor and a disk drive apparatus.

2. Description of the Related Art

Hitherto, a bearing mechanism using a fluid dynamic pressure has been utilized in a motor of a disk drive apparatus. A spindle motor disclosed in Japanese Patent Application Publication No. 2009-136143 includes a shaft, a first bearing component, a second bearing component, and a rotor component. The first bearing component is formed in a cup shape. A lower portion of the shaft is attached in an opening of the first bearing component. The second bearing component is of an annular shape, and is formed integrally with the shaft at an upper end portion of the shaft. The rotor component is disposed within a space defined by the shaft, the first bearing component, and the second bearing component. A fluid dynamic pressure radial bearing portion is formed between a cylindrical surface of the rotor component and an outer circumferential surface of the shaft.

A fluid dynamic pressure thrust bearing portion is formed between a lower surface of the rotor component and a surface of the first bearing component which axially faces the lower surface. A seal gap extending upward is configured in an outer side of the fluid dynamic pressure thrust bearing portion. A pumping seal portion is configured between a lower surface of the second bearing component and a surface of the rotor component which faces the lower surface. Another seal gap extending upward is configured in an outer side of the pumping seal portion.

Incidentally, in the spindle motor disclosed in Japanese Patent Application Publication No. 2009-136143, the motor may not be made thinner when obtaining an axial length of a radial gap and a fastening range between the shaft and the first bearing component. If the shaft and the first bearing component are manufactured as a single component, sufficient shape accuracy of the outer circumferential surface of the shaft may not be obtained because of the resulting complicated shape.

SUMMARY OF THE INVENTION

A motor according to a preferred embodiment of the present invention includes a rotating portion including a rotor magnet and a stationary portion including a stator facing the rotor magnet.

The stationary portion includes a shaft component which is centered on a central axis, an upper plate portion, and a lower plate portion. The upper plate portion extends radially outward from an upper portion of the shaft component. The lower plate portion extends radially outward from a lower portion of the shaft component. The rotating portion includes a sleeve portion. The sleeve portion is disposed between the upper plate portion and the lower plate portion.

The shaft component includes an inner shaft upper portion, an inner shaft lower portion, and an outer shaft portion of a cylindrical shape. The inner shaft lower portion is located in a lower side of the inner shaft upper portion. An outer circumferential surface of the inner shaft upper portion and an outer circumferential surface of the inner shaft lower portion are fixed on an inner circumferential surface of the outer shaft portion.

Lubricating oil is continuously present within an upper thrust gap between the sleeve portion and the upper plate portion, a radial gap between the sleeve portion and the outer shaft portion, and a lower thrust gap between the sleeve portion and the lower plate portion. In a region more radially outward than the radial gap, an upper seal portion is located between the stationary portion and the rotating portion. The interface of the lubricating oil is located in the upper seal portion. In the region more radially outward than the radial gap, a lower seal portion is located between the stationary portion and the rotating portion. The interface of the lubricating oil is located in the lower seal portion.

In the lower thrust gap, a lower thrust dynamic pressure generating groove array is provided on at least one of a lower surface of the sleeve portion and an upper surface of the lower plate portion.

In the radial gap, a radial dynamic pressure generating groove array is provided on at least one of an inner circumferential surface of the sleeve portion and an outer circumferential surface of the outer shaft portion.

In accordance with the preferred embodiments of the present invention, the shaft component and the vicinity thereof achieve excellent structural rigidity, and easily improve shape accuracy of the outer circumferential surface of the shaft component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, an upper side and a lower side of FIG. 1 in a direction of a central axis of a motor are simply referred to as an "upper side" and a "lower side", respectively. In addition, the upward and downward direction does not refer to a positional relation or a direction when being incorporated in an actual device. In addition, the direction parallel with a central axis or the direction substantially parallel therewith is referred to as an "axial direction", the radial direction centered on the central axis is simply referred to as a "radial direction", and the circumferential direction centered on the central axis is simply referred to as a "circumferential direction".

Figure 1:
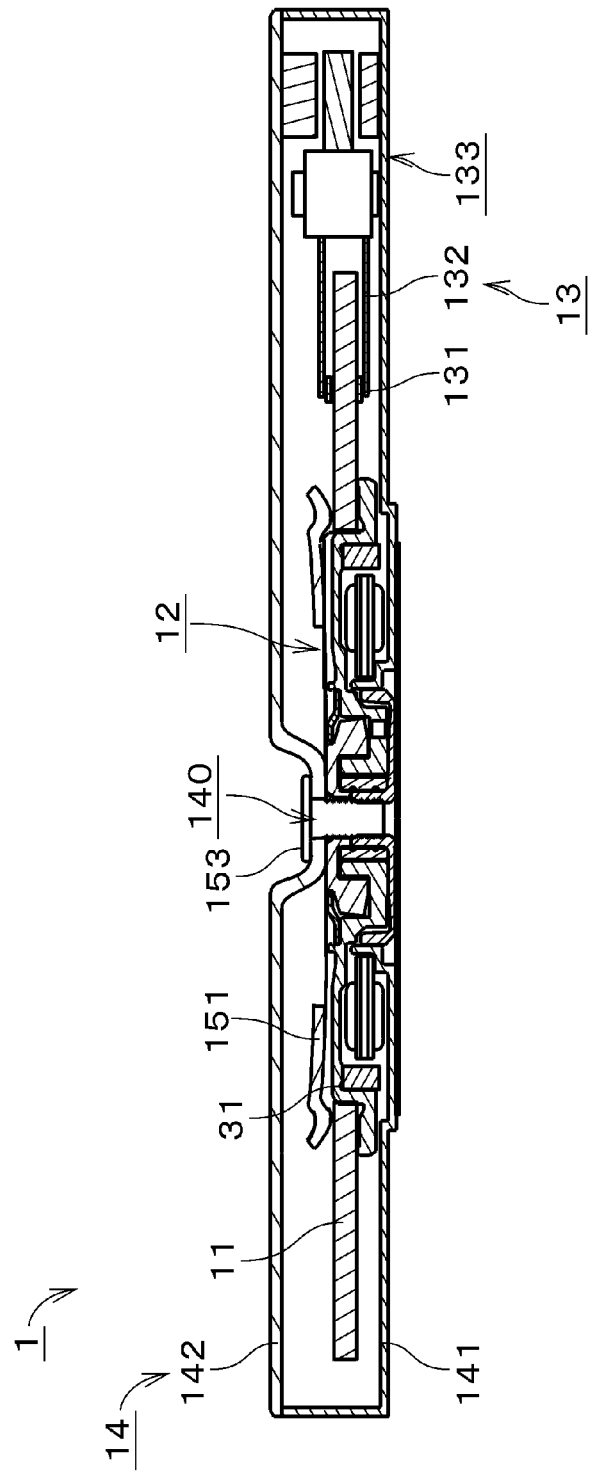
FIG. 1 is a cross-sectional view of a disk drive apparatus in accordance with a preferred embodiment of the present invention.

FIG. 1 is a vertical cross-sectional view of a disk drive apparatus 1 including a spindle motor (hereinafter, simply referred to as a "motor") according to an exemplary preferred embodiment of the present invention. The disk drive apparatus 1 is a so-called hard disk drive apparatus. The disk drive apparatus 1 includes a disk 11, a motor 12, an access portion 13, and a housing 14. The motor 12 rotates the disk 11 on which information is recorded. The access portion 13 performs at least one of reading and writing of the information from or to the disk 11.

The housing 14 preferably includes a first housing member 141 and a second housing member 142. The second housing member 142 is fitted to the first housing member 141 so as to define the housing 14. The housing 14 accommodates the disk 11, the motor 12, and the access portion 13. An internal space of the disk drive apparatus 1 is preferably a clean space having no, or only an extremely low presence of, dust, dirt, etc. In this preferred embodiment, air is preferably present inside the disk drive apparatus 1. In addition, the internal space of the disk drive apparatus 1 may be filled with, for example, helium gas or hydrogen gas, and may also be filled with a mixture of these gases and air if so desired.

The disk 11 is preferably clamped to the motor 12 by a clamper 151. The access portion 13 preferably includes a head 131, an arm 132, and a head moving mechanism 133. The head 131 approaches the disk 11 so as to magnetically perform at least one of reading and writing of the information. The arm 132 supports the head 131. The head moving mechanism 133 moves the arm 132 so as to move the head 131 relatively with respect to the disk 11. The above mechanism enables the head 131 make access to a desired position of the disk 11 with the head 131 being in close proximity to the rotating disk 11. In addition, the number of the heads 131 is preferably two, but is not limited to two. The number of the heads 131 may also be one or three or more. For example, the two heads 131 are disposed above and below the disk 11, respectively.

Figure 2:
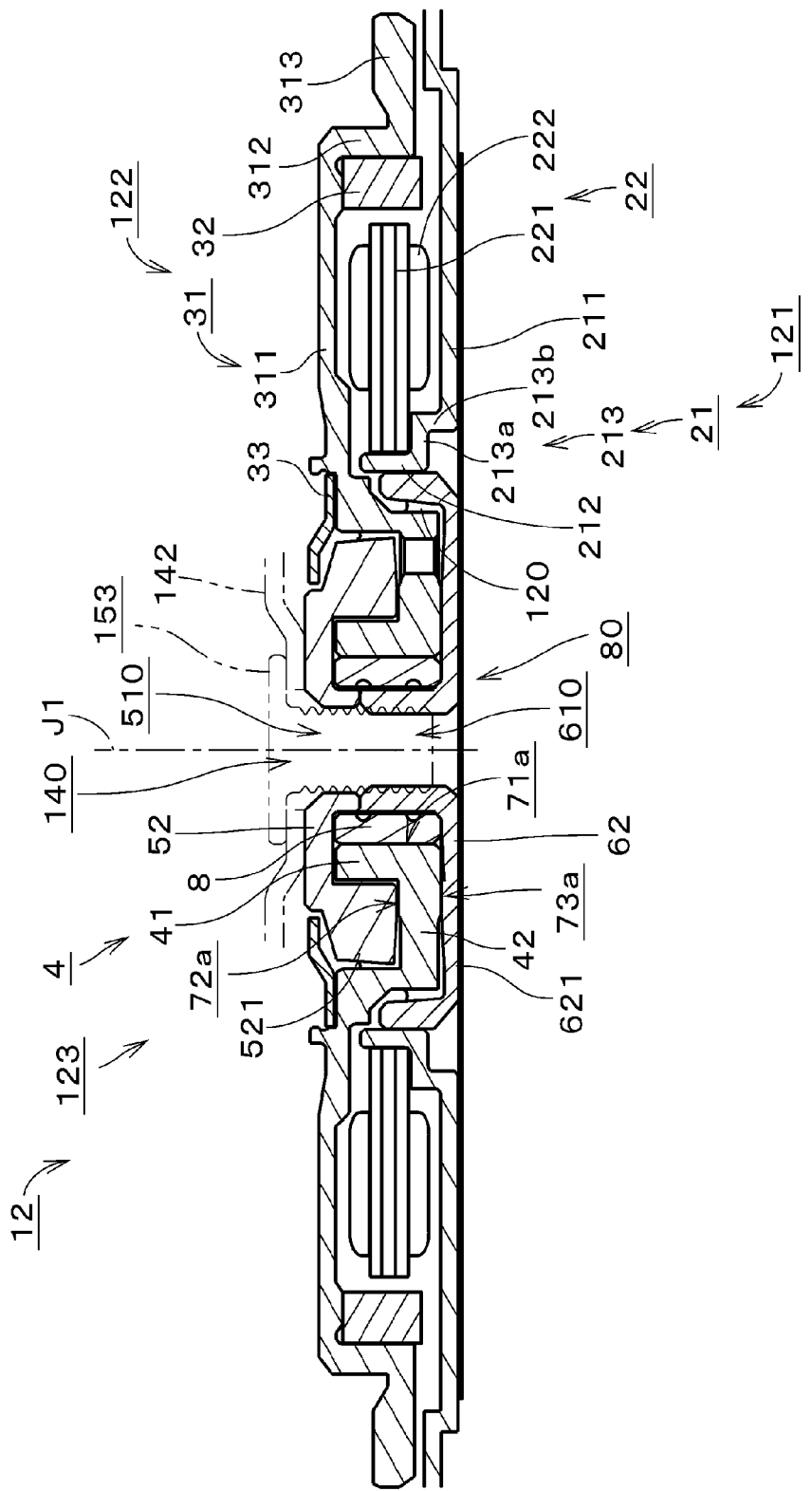
FIG. 2 is a cross-sectional view of a motor in accordance with a preferred embodiment of the present invention.

FIG. 2 is a vertical cross-sectional view of the motor 12. The motor 12 preferably includes a stationary portion 121, a rotating portion 122, and a bearing mechanism 123. The rotating portion 122 is preferably supported through the intermediary of lubricating oil 120 so as to be rotatable around a central axis J1 of the motor 12 with respect to the stationary portion 121.

The stationary portion 121 preferably includes a base plate 21 which is a base portion, and a stator 22. The base plate 21 is preferably provided monolithically with the first housing member 141 of FIG. 1 and defines a portion of the housing 14.

The base plate 21 is preferably shaped through, for example, press working. The base plate 21 preferably includes a bottom portion 211, a stator fixing portion 212, and a step portion 213. The stator fixing portion 212 preferably has a cylindrical or a substantially cylindrical shape, and faces upward from an inner edge portion of the bottom portion 211. The step portion 213 protrudes radially outward from a lower portion of the stator fixing portion 212 between the stator fixing portion 212 and the bottom portion 211. The step portion 213 preferably includes a step upper portion 213a which extends radially outward from the lower portion of the stator fixing portion 212, and a step lower portion 213b which faces downward from an outer edge of the step upper portion 213a.

The bearing mechanism 123 is disposed inside the stator fixing portion 212. The stator 22 preferably includes a stator core 221 and a coil 222. A conducting wire is wound on the stator core 21 such that the coil 222 is defined. A radially inner portion of the stator core 221 is fixed on an outer circumferential surface of the stator fixing portion 212. Further, a lower surface of the portion axially comes into contact with an upper surface of the step upper portion 213a. Preferably, the stator 22 is adhered to the stator fixing portion 212 through an adhesive interposing a gap between the stator 22 and the outer circumferential surface of the stator fixing portion 212.

The rotating portion 122 preferably includes a rotor hub 31 which is a hub portion, a rotor magnet 32, and a seal cap 33. The rotor hub 31 preferably is a monolithic member. The rotor hub 31 is preferably formed by shaping a slug into an approximate shape through a forging process and then shaping it into a final shape through cutting. The rotor hub 31 preferably includes a sleeve portion 4, a cover portion 311, a hub cylindrical portion 312, and a disk placing portion 313. The seal cap 33 is disposed on the upper side of the sleeve portion 4. The sleeve portion 4 also preferably defines a portion of the bearing mechanism 123. The cover portion 311 extends radially outward from the sleeve portion 4. The hub cylindrical portion 312 extends downward from an outer edge portion of the cover portion 311. The rotor magnet 32 is preferably fixed to an inner side of the hub cylindrical portion 312. The disk placing portion 313 protrudes radially outward from an outer circumferential surface of the hub cylindrical portion 312, and the disk 11 of FIG. 1 is disposed on the disk placing portion 313. The rotor magnet radially faces the stator 22. Torque is generated between the stator 22 and the rotor magnet 32.

Figure 3:
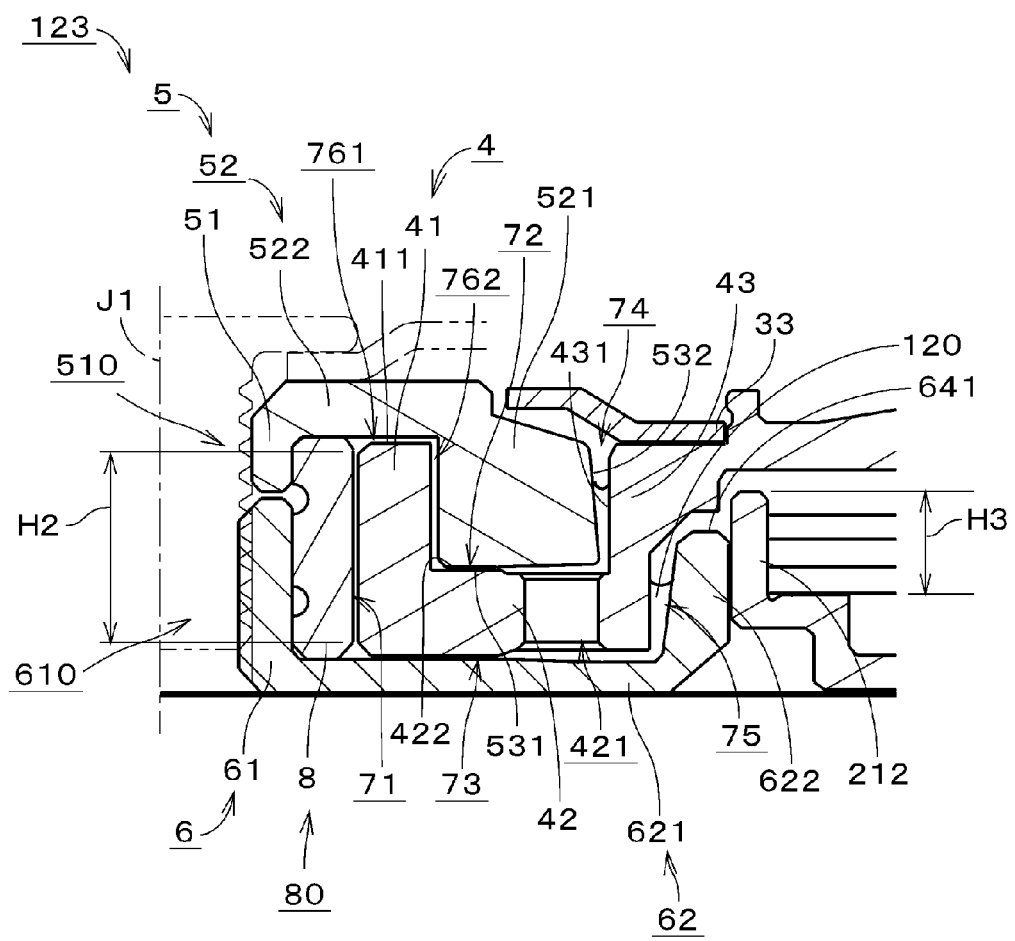
FIG. 3 is a cross-sectional view of a bearing mechanism in accordance with a preferred embodiment of the present invention.

FIG. 3 is an enlarged view illustrating the bearing mechanism 123. The bearing mechanism 123 preferably includes a sleeve portion 4, an upper cup member 5, a lower cup member 6, an outer shaft portion 8, and lubricating oil 120. The upper cup member 5 and the lower cup member 6 also define portions of the stationary portion 121. The sleeve portion 4 is located between the upper cup member 5 and the lower cup member 6. The sleeve portion 4 preferably includes an inner sleeve cylindrical portion 41, a sleeve flange portion 42, and an outer sleeve cylindrical portion 43. The inner sleeve cylindrical portion 41 preferably has a cylindrical or substantially cylindrical shape centered on the central axis J1. The outer shaft portion 8 is disposed in an inner side of the inner sleeve cylindrical portion 41 and is inserted into the inner sleeve cylindrical portion 41. The sleeve flange portion 42 extends radially outward from a lower portion of the inner sleeve cylindrical portion 41. The sleeve flange portion 42 preferably includes a communicating hole 421 which passes through an upper surface and a lower surface of the sleeve flange portion 42. In this preferred embodiment, the number of the communicating hole 421 preferably is one. However, two or more communicating holes 421 may also be provided.

Further, the communicating hole 421 may not be provided if so desired. The same also applies to the following other examples.

The outer sleeve cylindrical portion 43 extends upward from an outer edge portion of the sleeve flange portion 42. A height of an upper surface of the outer sleeve cylindrical portion 43 is preferably equal or nearly equal to a height of an upper surface 411 of the inner sleeve cylindrical portion 41. Hereinafter, a portion, which is a lower portion of the inner sleeve cylindrical portion 41 and is, at the same time, an inner peripheral portion of the sleeve flange portion 42, will be described as a portion of the inner sleeve cylindrical portion 41. Further, a portion, which is a lower portion of the outer sleeve cylindrical portion 43 and is, at the same time, an outer peripheral portion of the sleeve flange portion 42, will be described as a portion of the outer sleeve cylindrical portion 43. In the sleeve portion 4, a radial width between an outer circumferential surface of the inner sleeve cylindrical portion 41 and an inner circumferential surface 431 of the outer sleeve cylindrical portion 43 is greater than a radial thickness of the inner sleeve cylindrical portion 41.

The upper cup member 5 preferably includes an inner shaft upper portion 51 and an upper plate portion 52. The inner shaft upper portion 51 and the upper plate portion 52 are preferably defined by a single monolithic member. The inner shaft upper portion 51 and the upper plate portion 52 are preferably shaped through, for example, press working or a forging process. The upper cup member 5 may also be shaped through cutting. The inner shaft upper portion 51 is preferably centered on the central axis J1. The inner shaft upper portion 51 preferably includes an upper through hole 510 which passes along the central axis J1. The inner shaft upper portion 51 is inserted into the outer shaft portion 8 by clearance fit. The inner shaft upper portion 51 is preferably fixed on an inner surface of the outer shaft portion 8 by, for example, an adhesive. The upper plate portion 52 is of a cup shape which faces downward, and extends radially outward from an upper portion of the inner shaft upper portion 51.

The upper plate portion 52 preferably includes an upper plate cylindrical portion 521 and an upper plate connecting portion 522. The upper plate cylindrical portion 521 extends downward from an outer edge of the upper plate portion 52. The upper plate cylindrical portion 521 is located outside the inner sleeve cylindrical portion 41 and inside the outer sleeve cylindrical portion 43. A lower surface 531 of the upper plate cylindrical portion 521 axially faces the upper surface 422 of the sleeve flange portion 42. An outer circumferential surface 532 of the upper plate cylindrical portion 521 is inclined radially inward as heading upward. The upper plate connecting portion 522 connects the upper portion of the inner shaft upper portion 51 and an upper portion of the upper plate cylindrical portion 521 in the upper side of the inner sleeve cylindrical portion 41. In the upper cup member 5, a radial width of a lower surface of the upper plate connecting portion 522 is preferably greater than an axial distance between the lower surface 531 of the upper plate cylindrical portion 521 and the lower surface of the upper plate connecting portion 522.

The lower cup member 6 preferably includes an inner shaft lower portion 61 and a lower plate portion 62. The inner shaft lower portion 61 and the lower plate portion 62 are preferably defined by a single monolithic member. The inner shaft lower portion 61 and the lower plate portion 62 are preferably shaped through, for example, cutting, press working, or forging. The lower cup member 6 may also be shaped through cutting. The inner shaft lower portion 61 preferably has a cylindrical or substantially cylindrical shape centered on the central axis J1. The inner shaft lower portion 61 is located in the lower side of the inner shaft upper portion 51. The inner shaft lower portion 61 preferably includes a lower female screw portion 610 which passes along the central axis J1. The lower plate portion 62 preferably has a cup shape which faces upward, and extends radially outward from a lower portion of the inner shaft lower portion 61. In the motor 12, the sleeve portion 4 is preferably disposed between the lower plate portion 62 and the upper plate portion 52. The inner shaft lower portion 61 is inserted into the outer shaft portion 8 by clearance fit. The inner shaft lower portion 61 is preferably fixed on the inner surface of the outer shaft portion 8 by, for example, an adhesive.

The lower plate portion 62 preferably includes a lower plate connecting portion 621 and a lower plate cylindrical portion 622. The lower plate cylindrical portion 622 extends upward from an outer edge of the lower plate portion 62. The lower plate cylindrical portion 622 is located in the radially outer side of the outer sleeve cylindrical portion 43. The lower plate connecting portion 621 extends inward from a lower portion of the lower plate cylindrical portion 622 in the radial direction thereof, and connects the lower plate cylindrical portion 622 and the lower portion of the inner shaft lower portion 61 in the lower side of the sleeve flange portion 42. An axial thickness of the lower plate connecting portion 621 is preferably thinner than a radial thickness of the inner shaft lower portion 61 and a radial thickness of the lower plate cylindrical portion 622.

As shown in FIG. 1, the clamper 151 is fixed to the rotor hub 31. The disk 11 is supported by the clamper 151 and the rotor hub 31. The second housing member 142 which is a cover portion of the housing 14 includes a cover through hole 140. A cap screw 153 is inserted into the cover through hole 140. As shown in FIG. 2, the cover through hole 140 preferably axially overlaps with the upper through hole 510. The cap screw 153 is preferably screw-coupled to the lower female screw portion 610 through the cover through hole 140 and the upper through hole 510 from the outside of the housing 14. Accordingly, the upper plate portion 52 and the outer shaft portion 8 are sandwiched between the second housing member 142 and the lower plate portion 62, and the assembly strength of a shaft component 80 is enhanced. In addition, the second housing member 142 is strongly fixed to the upper plate portion 52.

As described above, the shaft component 80 which is a shaft portion of the bearing mechanism 123 is defined by the inner shaft upper portion 51, the inner shaft lower portion 61, and the outer shaft portion 8. The shaft component 80 is centered on the central axis J1. The upper plate portion 52 extends radially outward from an upper portion of the shaft component 80. The lower plate portion 62 extends radially outward from a lower portion of the shaft component 80.

Figure 4:
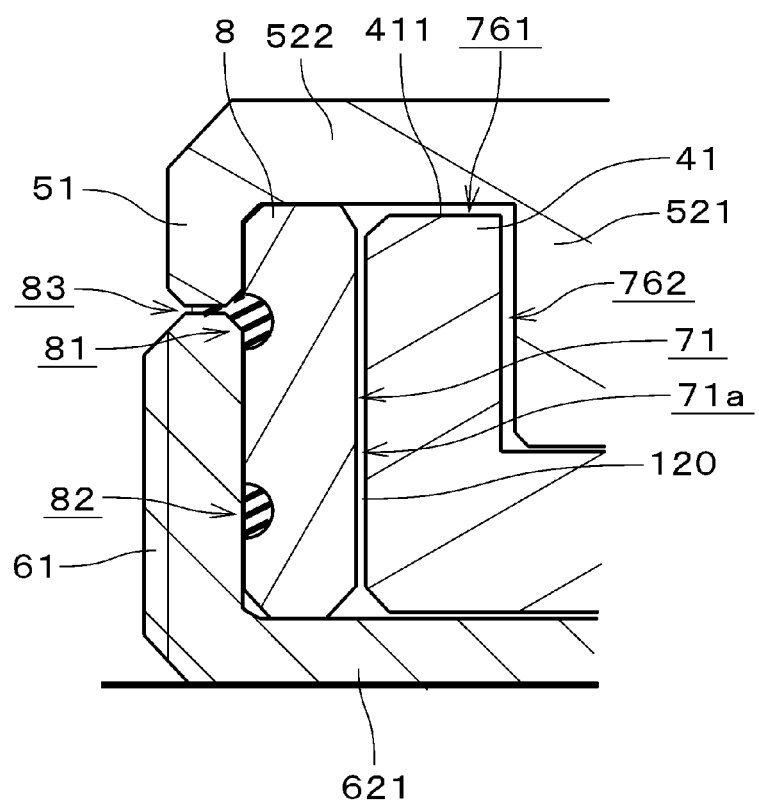
FIG. 4 is an enlarged cross-sectional view illustrating a portion of the bearing mechanism in accordance with a preferred embodiment of the present invention.

FIG. 4 is an enlarged view illustrating the vicinity of the outer shaft portion 8 of the bearing mechanism 123. The upper plate connecting portion 522 is located in the upper sides of the outer shaft portion 8 and the inner sleeve cylindrical portion 41. An upper end of the outer shaft portion 8 axially comes into contact with the lower surface of the upper plate connecting portion 522. A lower end of the outer shaft portion 8 axially comes into contact with the upper surface of the lower plate connecting portion 621. A minute gap 83 is preferably present between a lower end of the inner shaft upper portion 51 and an upper end of the inner shaft lower portion 61. Accordingly, the distance between the lower surface of the upper plate connecting portion 522 and the upper surface of the lower plate connecting portion 621 is exactly determined by the outer shaft portion 8.

A minute gap 761, which extends in the radial direction, is preferably defined between the upper surface 411 of the inner sleeve cylindrical portion 41 and the lower surface of the upper plate connecting portion 522. A gap 762, which preferably has a cylindrical or substantially cylindrical shape centered on the central axis J1, is defined between the outer circumferential surface of the inner sleeve cylindrical portion 41 and the inner circumferential surface of the upper plate cylindrical portion 521. A radial gap 71 is preferably defined between the outer circumferential surface of the outer shaft portion 8 and the inner circumferential surface of the inner sleeve cylindrical portion 41. As shown in FIG. 3, an existing range H2 of the radial gap 71 radially overlaps with an entirety of an existing range H3 of the stator fixing portion 212 in the axial direction.

As shown in FIG. 4, the outer shaft portion 8 preferably includes, on the inner circumferential surface thereof, two adhesive retaining portions 81 and 82 which are recessed radially outward. Each of the adhesive retaining portions 81 and 82 preferably has an annular or substantially annular shape centered on the central axis J1. The upper adhesive retaining portion 81 radially overlaps with the gap 83 between the inner shaft upper portion 51 and the inner shaft lower portion 61. An adhesive is present within each of the adhesive retaining portions 81 and 82. The adhesive is also preferably present within the gap 83. The adhesive is indicated by the bold parallel diagonal stripes. In other drawings, for the sake of clarity, the adhesive is not shown even though it is preferably present. The inner circumferential surface of the outer shaft portion 8 is fixed on the outer circumferential surface of the inner shaft upper portion 51 and the outer circumferential surface of the inner shaft lower portion 61 by the adhesive. Furthermore, these elements are strongly fixed by the adhesive retaining portions 81 and 82. In the gap 83, the adhesive is preferably continuously present in the circumferential direction to form an annular or substantially annular shape. Consequently, the lubricating oil 120 is prevented from leaking and airtightness is maintained.

Figure 5:
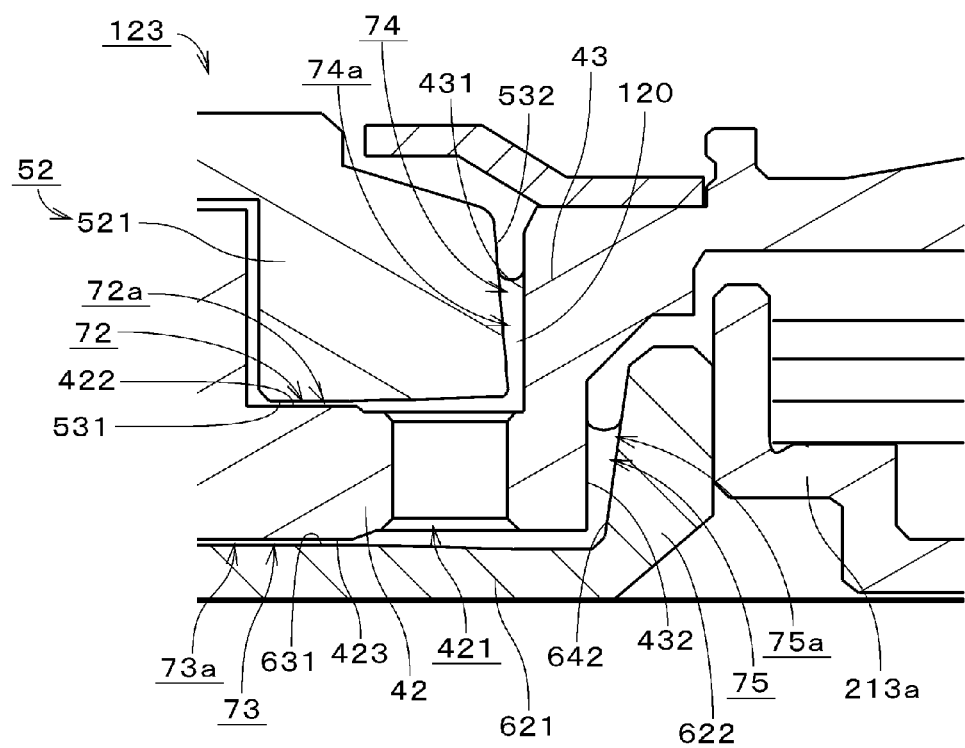
FIG. 5 is an enlarged cross-sectional view illustrating a portion of the bearing mechanism in accordance with a preferred embodiment of the present invention.

FIG. 5 is an enlarged view illustrating the vicinity of the sleeve flange portion 42 of the bearing mechanism 123. A gap 72 is preferably defined between a region more radially inward than the communicating hole 421 of the upper surface 422 of the sleeve flange portion 42 and the lower surface 531 of the upper plate cylindrical portion 521. Hereinafter, the gap 72 is referred to as an "upper thrust gap 72". The upper thrust gap 72 is communicated with the upper portion of the radial gap 71 through the gap 762 between the outer circumferential surface of the inner sleeve cylindrical portion 41 shown in FIG. 3 and the inner circumferential surface of the upper plate cylindrical portion 521 and the gap 761 between the upper surface 411 of the inner sleeve cylindrical portion and the lower surface of the upper plate connecting portion 522. Hereinafter, the gap 761 is referred to as a "lateral communicating gap 761" and the gap 762 is referred to as a "vertical communicating gap 762".

A gap 73 is preferably defined between a region more radially inward than the communicating hole 421 of the lower surface 423 of the sleeve flange portion 42 shown in FIG. 5 and the upper surface 631 of the lower plate connecting portion 621. Hereinafter, the gap 73 is referred to as a "lower thrust gap 73". The upper thrust gap 72 and the lower thrust gap 73 are communicated with each other by the communicating hole 421.

Figure 6:
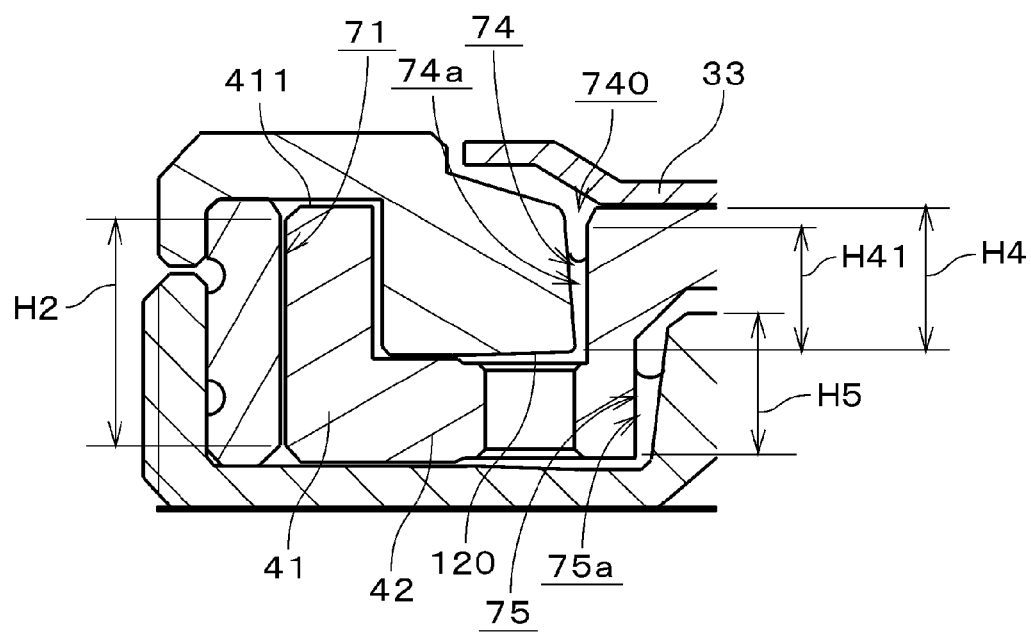
FIG. 6 is a cross-sectional view of the bearing mechanism in accordance with a preferred embodiment of the present invention.

A gap 74 which possesses an opening in an axially upward end thereof is preferably defined between the outer circumferential surface 532 of the upper plate cylindrical portion 521 and the inner circumferential surface 431 of the outer sleeve cylindrical portion 43. Hereinafter, the gap 74 is referred to as an "upper seal gap 74". A radial width of the upper seal gap 74 gradually increases as heading upward. As shown in FIG. 6, an axial length H4 of the upper seal gap 74 is preferably greater than the thickness of the sleeve flange portion 42. A height of an opening 740 of the upper seal gap 74 is preferably equal or nearly equal to the height of the upper surface 411 of the inner sleeve cylindrical portion 41. The upper surface 411 of the inner sleeve cylindrical portion 41 may also be located higher than the opening 740 of the upper seal gap 74.

In the upper seal gap 74, an upper seal portion 74a which retains the lubricating oil 120 by capillary action is provided. The interface of the lubricating oil 120 is located in the upper seal portion 74a. The upper seal portion 74a is located more radially outward than the radial gap 71. The opening 740 of the upper seal gap 74 is covered by the seal cap 33.

As shown in FIG. 5, the inner circumferential surface 642 of the lower plate cylindrical portion 622 is preferably inclined radially outward as it extends upward. A gap 75 which possesses an opening in an axially upward end thereof is preferably defined between the inner circumferential surface 642 and the lower portion 432 of the outer circumferential surface of the outer sleeve cylindrical portion 43. Hereinafter, the gap 75 is referred to as a "lower seal gap 75". A radial width of the lower seal gap 75 gradually increases heading upward. The lower seal gap 75 preferably radially overlaps with the upper surface of the step upper portion 213a. In the lower seal gap 75, a lower seal portion 75a which retains the lubricating oil 120 by capillary action is provided. The interface of the lubricating oil 120 is preferably located in the lower seal portion 75a. The lower seal portion 75a is located more radially outward than the upper seal portion 74a and the radial gap 71 of FIG. 4. The lower seal portion 75a is connected to the upper seal portion 74a through the communicating hole 421. Consequently, generation of a pressure difference between the upper and lower seal portions 74a and 75a may be reduced.

As shown in FIG. 6, a possible existing range H41 in the axial direction of the upper seal portion 74a preferably radially overlaps with the existing range H2 in the axial direction of the radial gap 71, throughout an entire length of the upper seal portion. The possible existing range H41 of the upper seal portion 74a represents a range in the axial direction from a bottom position of the upper seal gap 74 to the upper limit of a position where the interface of the lubricating oil 120 can be formed. An upper end of the possible existing range H41 of the upper seal portion 74a may also conform to the interface of the lubricating oil 120 in the axial direction. Similarly, a possible existing range H5 in the axial direction of the lower seal portion 75a radially overlaps with the existing range H2 of the radial gap 71, throughout nearly an entire length of the lower seal portion. The possible existing range H5 of the lower seal portion 75a represents a range in the axial direction from a bottom position of the lower seal gap 75 to the upper limit of a position where the interface of the lubricating oil 120 can be provided. Further, a portion of the possible existing range H41 of the upper seal portion 74a may radially overlap with the possible existing range H5 of the lower seal portion 75a. In addition, an upper end of the possible existing range H5 of the lower seal portion 75a may also conform to the interface of the lubricating oil 120 in the axial direction. The same also applies to the other preferred embodiments described below.

As shown in FIG. 3, in the bearing mechanism 123, the lubricating oil 120 is preferably filled continuously in the upper seal gap 74, the upper thrust gap 72, the vertical communicating gap 762, the lateral communicating gap 761, the radial gap 71, the lower thrust gap 73, the lower seal gap 75, and the communicating hole 421.

Figure 7:
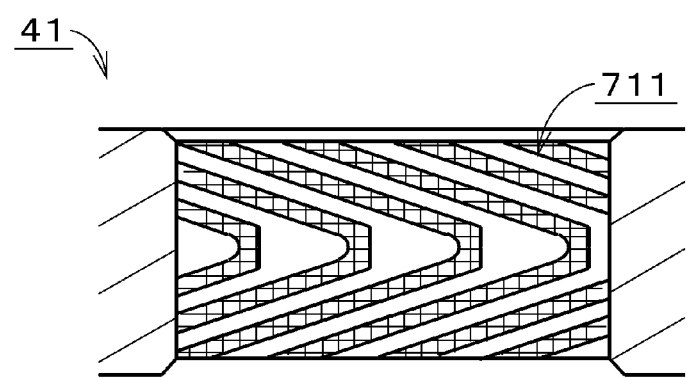
FIG. 7 is a cross-sectional view of an inner sleeve cylindrical portion in accordance with a preferred embodiment of the present invention.

FIG. 7 is a cross-sectional view of the inner sleeve cylindrical portion 41 which shows a shape of the inner sleeve cylindrical portion 41. The inner circumferential surface of the inner sleeve cylindrical portion 41 preferably includes a radial dynamic pressure generating groove array 711. In FIG. 7, dynamic pressure grooves are denoted by cross-hatching. Also, in the other drawings, the dynamic pressure generating grooves are denoted by cross-hatching. The radial dynamic pressure generating groove array 711 is preferably an aggregate of herringbone-shaped grooves, namely, a plurality of V-shaped or substantially V-shaped grooves arranged laterally along the circumferential direction of the inner circumferential surface.

In the radial gap 71 shown in FIG. 4, a radial dynamic pressure bearing portion 71a which generates a fluid dynamic pressure on the lubricating oil 120 in the radial direction is preferably provided by the radial dynamic pressure generating groove array 711.

Figure 8:
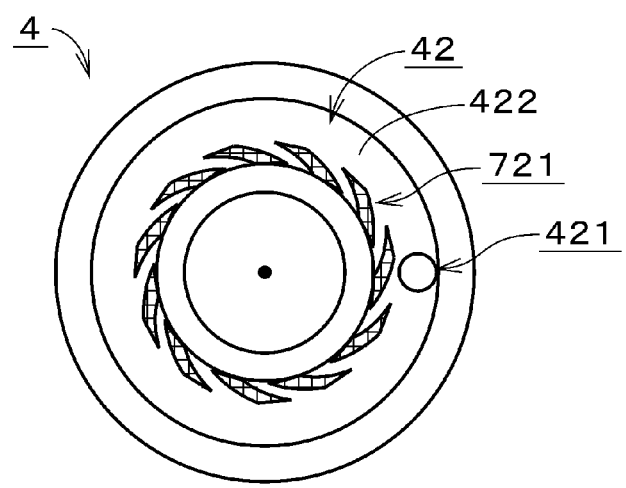
FIG. 8 is a top view of a sleeve portion in accordance with a preferred embodiment of the present invention.

FIG. 8 is a top view of the sleeve portion 4. In the upper surface 422 of the sleeve flange portion 42, an upper thrust dynamic pressure generating groove array 721 of a spiral shape is provided. The upper thrust dynamic pressure generating groove array 721 is preferably arranged more radially inward than the upper opening of the communicating hole 421. However, a portion of the upper thrust dynamic pressure generating groove array 721 may also overlap with the opening of the communicating hole 421. In the upper thrust gap 72 shown in FIG. 5, an upper thrust dynamic pressure bearing portion 72a which generates a fluid dynamic pressure on the lubricating oil 120 in the axial direction is preferably defined by the upper thrust dynamic pressure generating groove array 721.

Figure 9:
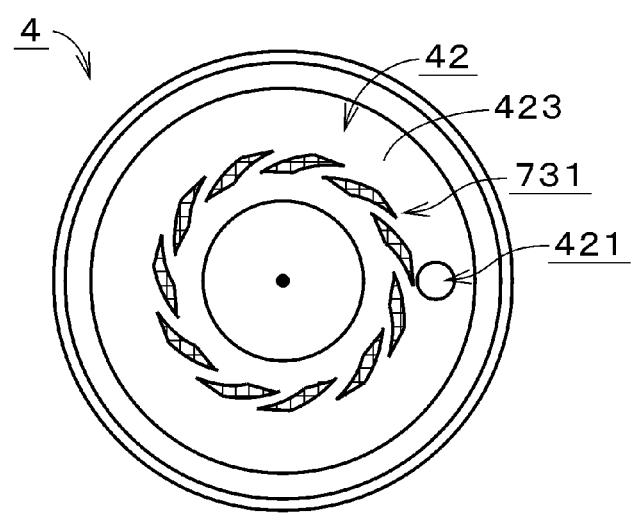
FIG. 9 is a bottom view of the sleeve portion in accordance with a preferred embodiment of the present invention.

FIG. 9 is a bottom view of the sleeve portion 4. In the lower surface 423 of the sleeve flange portion 42, a lower thrust dynamic pressure generating groove array 731 of a spiral shape is preferably provided. The lower thrust dynamic pressure generating groove array 731 is preferably arranged more radially inward than the lower opening of the communicating hole 421. However, a portion of the lower thrust dynamic pressure generating groove array 731 may also overlap with the opening of the communicating hole 421. In the lower thrust gap 73 shown in FIG. 5, a lower thrust dynamic pressure bearing portion 73a which generates a fluid dynamic pressure on the lubricating oil 120 in the axial direction is defined by the lower thrust dynamic pressure generating groove array 731.

When the motor 12 shown in FIG. 2 is driven, the inner sleeve cylindrical portion 41 is supported in the radial direction with respect to the outer shaft portion 8 by the radial dynamic pressure bearing portion 71a. Further, the sleeve flange portion 42 is supported in the axial direction with respect to the upper plate cylindrical portion 521 and the lower plate connecting portion 621 by the thrust dynamic pressure bearing defined by the upper thrust dynamic pressure bearing portion 72a and the lower thrust dynamic pressure bearing portion 73a. The upper thrust dynamic pressure bearing portion 72a and the lower thrust dynamic pressure bearing portion 73a are provided at the upper and lower portions of the sleeve flange portion 42 so that the sleeve portion 4 is supported in the axial direction at a position which is spaced away from the central axis J1. As a result, the bearing rigidity of the bearing mechanism 123 is significantly improved.

Although the disk drive apparatus 1 including the motor 12 has been described above, in the motor 12, the outer shaft portion 8 is preferably provided by a member having a cylindrical or substantially cylindrical shape, and a process such as, for example, polishing on the outer circumferential surface can be easily performed. Consequently, the shape accuracy of the outer circumferential surface of the shaft component 80 can be easily improved, and manufacturing costs of the motor 12 can be reduced. In particular, even in a case of obtaining structural rigidity of the shaft component 80 and the vicinity thereof by using the upper cup member 5 and the lower cup member 6 which are of a cup shape and include a portion of the shaft, the shape accuracy of the outer circumferential surface of the shaft component 80 can be easily improved.

Since the axial lengths of the inner shaft upper portion 51 and the inner shaft lower portion 61 are shorter compared to the axial length of the shaft component 80, the upper cup member 5 and the lower cup member 6 may be easily shaped through, for example, press working or forging. As a result, manufacturing costs may be reduced. Further, if they are substantially shaped through press working or forging, a cutting process may be performed after the press working, or, for example, a grinding or finishing process may also be performed after the forging in the manufacture of the upper cup member 5 and the lower cup member 6.

In addition, the inner shaft upper portion 51 and the upper plate portion 52 are preferably provided by a single monolithic member, and the inner shaft lower portion 61 and the lower plate portion 62 are defined by a single monolithic member. Furthermore, the inner shaft upper portion 51 and the inner shaft lower portion 61 are inserted into the outer shaft portion 8 to adhere to each other such that the rigidity of the shaft component 80 can be easily improved.

In the motor 12, since the outer shaft portion 8 is preferably provided as a separate member, a material of the outer shaft portion 8 can be easily selected. Accordingly, selecting, as a material for the outer shaft portion 8, a material having a higher thermal expansion coefficient than that of a material for the sleeve portion 4, the bearing rigidity after a temperature increase can be easily obtained. As a result, the radial bearing can be easily designed.

As shown in FIG. 6, in the motor 12, the existing range H2 of the radial gap 71, the entirety of the possible existing range H41 of the upper seal portion 74a, and nearly the entirety of the possible existing range H5 of the lower seal portion 75a radially overlap with each other. Consequently, the motor 12 can be made slimmer.

As shown in FIG. 3, the stator fixing portion 212 preferably radially overlaps with the radial gap 71 such that the motor 12 can be made even slimmer. In the bearing mechanism 123, the lower seal gap 75 is preferably located more radially outward than the upper seal gap 74, and the lower surface 531 of the upper plate cylindrical portion 521 is preferably located lower than the upper end 641 of the lower plate cylindrical portion 622 in the axial direction. Consequently, the axial lengths of the upper seal gap 74 and the lower seal gap 75 can be lengthened, so that an oil buffer of the lubricating oil 120 in the gaps 74 and 75 can be sufficiently obtained. As a result, the life span of the motor 12 can be increased. In the motor 12, since the sleeve flange portion 42 is thin, it may be possible to further lengthen the axial length of the upper seal gap 74 while reducing the height of the motor 12. As a result, it may be possible to further increase an oil buffer of the lubricating oil 120.

In the sleeve portion 4, it may be possible to widen the radial width of the upper thrust dynamic pressure generating groove array 721 arranged on the sleeve flange portion 42 by widening the radial width between the outer circumferential surface of the inner sleeve cylindrical portion 41 and the inner circumferential surface 431 of the outer sleeve cylindrical portion 43. By such a configuration, the size of the upper thrust dynamic pressure bearing portion 72a can be increased. Since the thickness of the inner sleeve cylindrical portion 41 is thin as compared to the width between the inner sleeve cylindrical portion 41 and the outer sleeve cylindrical portion 43, the inner sleeve cylindrical portion 41 can be easily formed when shaping the sleeve portion 4 through, for example, a forging process. The radial width of the lower surface of the upper plate connecting portion 522 is greater than the axial distance between the lower surface 531 of the upper plate cylindrical portion 521 and the lower surface of the upper plate connecting portion 522. Consequently, it may be possible to easily form the space, which is defined between the upper plate cylindrical portion 521, the upper plate connecting portion 522, and the inner shaft upper portion 51, through cutting.

The communicating hole 421 is preferably provided in the sleeve flange portion 42 such that it is possible to shorten the communicating hole 421, and such that it is possible to reduce flow path resistance in the communicating hole 421. Further, it is possible to reduce the amount of the lubricating oil 120 in the communicating hole 421, so that a change of the interface of the lubricating oil 120 in the upper seal portion 74a and the lower seal portion 75a caused by the force of gravity can be suppressed.

The upper end of the outer shaft portion 8 axially comes into contact with the lower surface of the upper plate connecting portion 522, and the lower end of the outer shaft portion 8 axially comes into contact with the upper surface of the lower plate connecting portion 621. Consequently, it is possible to set the axial distance between the lower surface 531 of the upper plate cylindrical portion 521 and the upper surface 631 of the lower plate connecting portion 621 with high precision. As a result, it is possible to easily set the sum of the axial widths of the upper thrust gap 72 and the lower thrust gap 73. By making the axial thickness of the lower plate connecting portion 621 thin, the sleeve flange portion 42 is prevented from having an excessively thin thickness even if the motor 12 is rendered thinner.

The outer circumferential surface of the lower plate cylindrical portion 622 is fixed to the inner circumferential surface of the cylindrical stator fixing portion 212. Consequently, transmission of a vibration due to a shake of the bearing mechanism 123 to a region located more outward than the stator fixing portion 212 of the base plate 21 can be suppressed. In addition, the step portion 213 is provided at the base plate 21 so that the rigidity of the base plate 21 can be improved. As a result, transmission of the vibration of the stator 22 to the bearing mechanism 123 can be suppressed.

Since the inner shaft upper portion 51 and the outer shaft portion 8 are fitted to each other in a clearance fit and the inner shaft lower portion 61 and the outer shaft portion 8 are fitted to each other in a clearance fit, it is possible to easily assemble the upper cup member 5 and the lower cup member 6.

Figure 10:
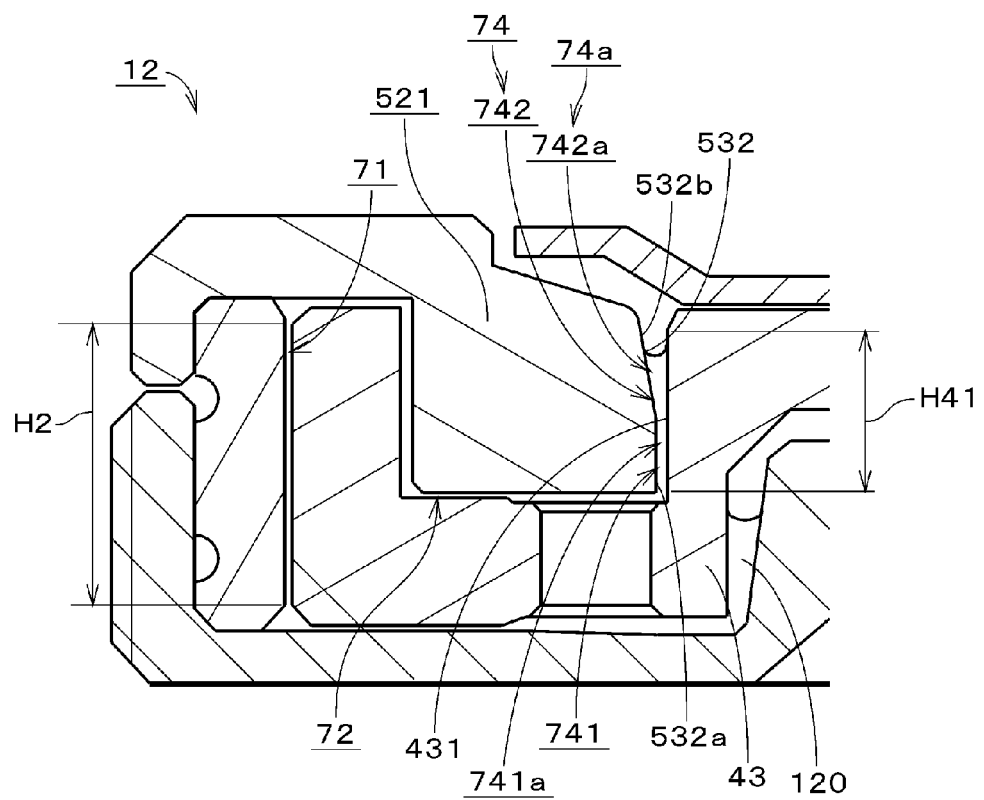
FIG. 10 is a cross-sectional view illustrating a portion of a bearing mechanism according to another example of a preferred embodiment of the present invention.

FIG. 10 is a drawing illustrating another example of an upper seal portion in accordance with a preferred embodiment of the present invention. The outer circumferential surface 532 of the upper plate cylindrical portion 521 preferably includes a cylindrical surface 532a which extends in the axial direction, and an inclined surface 532b which inclines radially inward as it extends upward from the cylindrical surface 532a. The upper seal gap 74 preferably includes a gap 741 defined between the cylindrical surface 532a and the lower portion of the inner circumferential surface 431 of the outer sleeve cylindrical portion 43, and a gap 742 defined between the inclined surface 532b and the upper portion of the inner circumferential surface 431 of the outer sleeve cylindrical portion 43. Hereinafter, the gap 741 is referred to as a "cylindrical gap 741". The gap 742 is referred to as a "tapered gap 742". A dynamic pressure groove array is preferably provided on the cylindrical surface 532a or the inner circumferential surface 431 which faces the cylindrical surface 532a. A dynamic pressure generating portion 741a which generates a dynamic pressure facing the upper thrust gap 72 on the lubricating oil 120 when the motor 12 is driven is preferably provided in the cylindrical gap 741. A tapered seal portion 742a which retains the lubricating oil 120 by a capillary action is preferably arranged in the tapered gap 742. In FIG. 10, the upper seal portion 74a is defined by the dynamic pressure generating portion 741a and the tapered seal portion 742a.

When the motor 12 is at rest, the interface of the lubricating oil 120 is located within the tapered seal portion 742a. When the motor 12 is driven, the interface of the lubricating oil 120 is located within the dynamic pressure generating portion 741a. The upper seal portion 74a preferably includes the dynamic pressure generating portion 741a and the tapered seal portion 742a such that it is possible to more reliably retain the lubricating oil 120 within the upper seal gap 74. When the motor 12 is at rest, the possible existing range H41 of the upper seal portion 74a, namely, the entirety of the axially range between a bottom position of the cylindrical gap 741 and the upper limit of the interface of the lubricating oil 120 in the tapered seal portion 742a radially overlaps with the existing range H2 of the radial gap 71.

Figure 11:
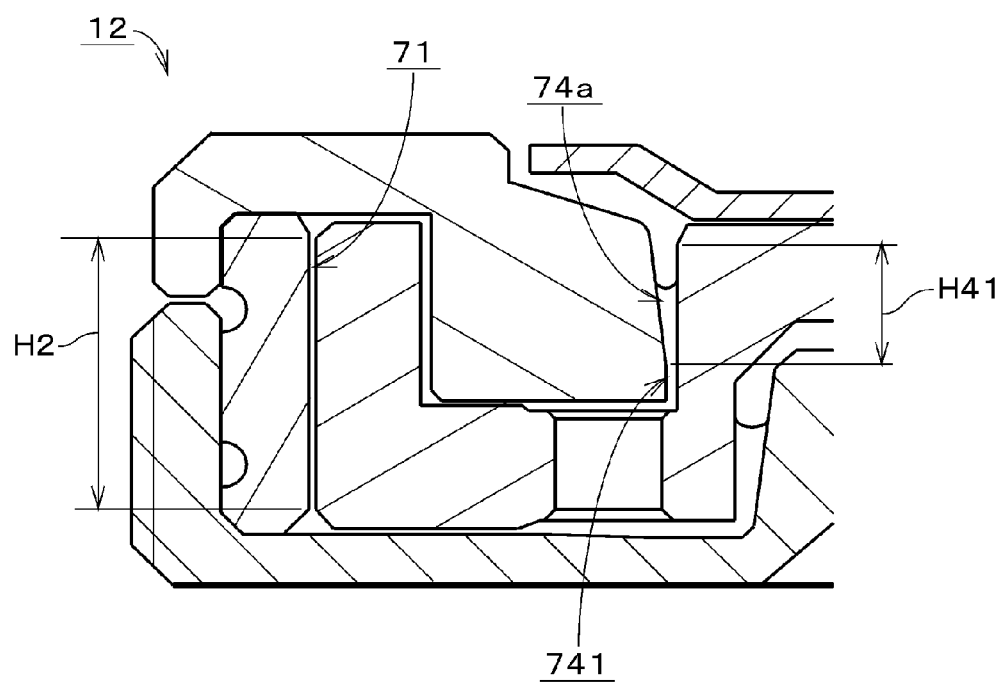
FIG. 11 is a cross-sectional view illustrating a bearing mechanism according to an additional example of a preferred embodiment of the present invention.

As shown in FIG. 11, in the motor 12, a minute cylindrical gap 741 which does not have a dynamic pressure generating portion may also be provided in the lower side of the upper seal portion 74a. The cylindrical gap 741 is not included in the upper seal portion 74a. Even in this case, the possible existing range H41 of the upper seal portion 74a radially overlaps with the existing range H2 of the radial gap 71 such that it is possible to reduce the height of the motor 12.

Figure 12:
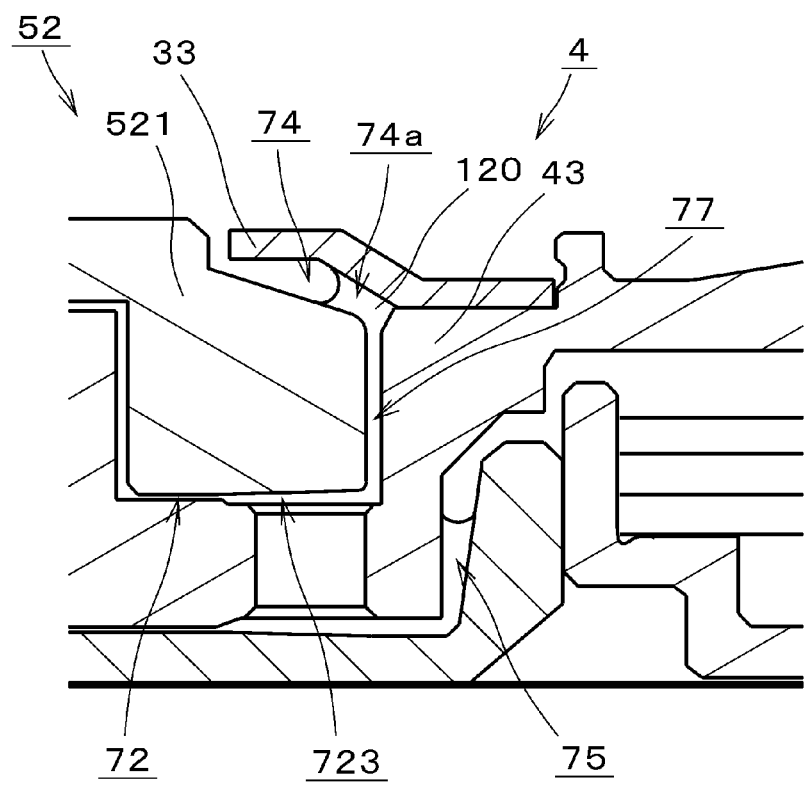
FIG. 12 is a cross-sectional view illustrating a bearing mechanism according to another further example of a preferred embodiment of the present invention.

FIG. 12 is a drawing illustrating an upper seal portion 74a in accordance with another further example of a preferred embodiment of the present invention. The structures of the motor other than the upper seal portion 74a are preferably the same or substantially the same as those of FIG. 3. In FIG. 12, the upper seal portion 74a is formed in an upper seal gap 74 between the upper surface of the upper plate portion 52 and the lower surface of the seal cap 33. Similarly to FIG. 3, the seal cap 33 extends radially inward from the outer peripheral portion of the sleeve portion 4 in the upper side of the upper plate portion 52. Consequently, it is possible to make the axial width of the upper seal portion 74a small. In addition, it is possible to more reliably prevent leakage of the lubricating oil 120 by using a centrifugal force during rotation.

In more detail, the seal cap 33 extends radially inward from the upper portion of the outer sleeve cylindrical portion 43. A vertical gap 77 is preferably defined between the outer circumferential surface of the upper plate cylindrical portion 521 and the inner circumferential surface of the outer sleeve cylindrical portion 43. The lubricating oil 120 which continues from the upper thrust gap 72 is present within the vertical gap 77. The outer circumferential surface of the upper plate cylindrical portion 521 is a cylindrical surface. The upper seal portion 74a is arranged between the upper surface of the upper plate cylindrical portion 521 and the lower surface of the seal cap 33. The upper seal gap 74 has an axial width which gradually increases as it extends radially inward, and inclines upward.

In the structure of FIG. 12, by making the axial width of the upper seal portion 74a small, a design to increase axial widths in structures other than the upper seal portion 74a of the bearing mechanism becomes possible. As a result, securing of the rigidity of the member or improvement in impact resistance of the member becomes easier.

In addition, it is possible to make the opening of the upper seal gap 74 large by greatly inclining the upper seal gap 74. That is, it becomes possible to retain a lot of lubricating oils 120 in the upper seal gap 74. Therefore, by making the greater angle of the gap extending in the upper seal gap 74 rather than the lower seal gap 75, and as a result, it is possible to reduce the amount of the lubricating oil in the upper seal gap 74 during rest. Consequently, impact resistance during rest can be improved.

In the lower seal gap 75, a groove arranged to push the lubricating oil downward during rotation is defined, and an appropriate amount of the lubricating oil is retained in the upper seal gap 74 and the lower seal gap 75 during the rotation. The volume of the lubricating oil retained in the upper seal gap 74 during the rotation is preferably greater than the volume of a space 723 of the radial outside of the upper thrust gap 72. By such a structure, it is possible to increase an inner pressure of the bearing and to suppress generation of bubbles, by using a centrifugal force acting on the lubricating oil of the upper seal portion 74a during the rotation. A groove to rake out the air bubbles may also preferably be provided in the surfaces defining the space 723.

Figure 13:
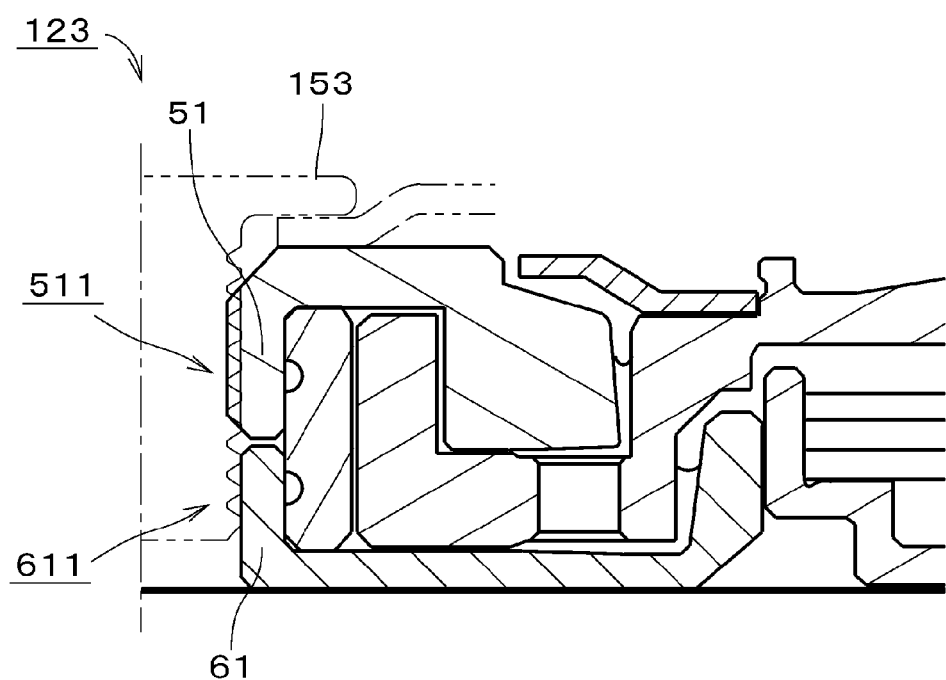
FIG. 13 is a cross-sectional view illustrating a bearing mechanism according to a still another further example of a preferred embodiment of the present invention.

FIG. 13 is a drawing illustrating a still further example of a preferred embodiment of a bearing mechanism 123 in accordance with the present invention. In the bearing mechanism 123 of FIG. 13, the inner shaft upper portion 51 preferably includes an upper female screw portion 511, and the inner shaft lower portion 61 preferably includes a lower through hole 611. The cap screw 153 is screwed to the upper female screw portion 511. Other structures of the bearing mechanism 123 are preferably the same or substantially the same as those of FIG. 3.

Although a preferred embodiment of the present invention has been described above, the present invention is not limited thereto and various modifications may be made.

The positions of the upper thrust gap 72 and the lower thrust gap 73 in the above preferred embodiment may be appropriately changed. For example, the sleeve portion 4 may have an annular or substantially annular plate shape, the upper thrust gap 72 may be arranged between the upper surface of the sleeve portion 4 and the upper plate portion 52, and the lower thrust gap 73 may be arranged between the lower surface of the sleeve portion 4 and the upper surface of the lower plate portion 62. In the structure of the bearing mechanism 123, the sleeve flange portion 42 may also extend radially outward from the upper portion or central portion of the inner sleeve cylindrical portion 41, instead of the lower portion the inner sleeve cylindrical portion 41.

If the upper seal portion 74a is located more radially outward than the radial gap 71 and between the stationary portion 121 and the rotating portion 122, the upper seal portion 74a may be formed in various aspects. If the lower seal portion 75a is also preferably located more radially outward than the radial gap 71 and between the stationary portion 121 and the rotating portion 122, the lower seal portion 75a may be arranged in various aspects.

The inner shaft upper portion 51 may also be located inside the outer shaft portion 8 in a tight-fitted state. The inner shaft lower portion 61 may also be located inside the outer shaft portion 8 in a tight-fitted state. The inner shaft upper portion 51 and the inner shaft lower portion 61 may also be fixed to the outer shaft portion 8 by, for example, press fitting and an adhesive or by shrinkage fitting. Also, the inner shaft upper portion 51 and the inner shaft lower portion 61 may also be provided without the female screw portion. Furthermore, the through hole may not be present.

In the above preferred embodiments, the existing range H2 of the radial gap 71 may also radially overlap with at least a portion of the possible existing range H41 of the upper seal portion 74a and at least a portion of the possible existing range H5 of the lower seal portion 75a. Consequently, the motor can be made slimmer. Furthermore, the existing range H2 of the radial gap 71 may also radially overlap with at least a portion of the possible existing range H3 of the stator fixing portion 212 such that the motor can be made slimmer.

In the above-described preferred embodiments, the lower seal gap 75 preferably is located higher than that of FIG. 3 such that the existing range of the lower seal portion 75a may also radially overlap with the entirety of the existing range of the upper seal portion 74a.

In the above-described preferred embodiments, the upper thrust dynamic pressure generating groove array may be arranged on the lower surface 531 of the upper plate cylindrical portion 521, and may also be provided on both the lower surface 531 and the upper surface 422 of the sleeve flange portion 42. The upper thrust dynamic pressure generating groove array may be arranged on at least one of the upper surface of the sleeve portion 4 and the lower surface of the upper plate portion 52 which define the upper thrust gap 72. The lower thrust dynamic pressure generating groove array may be arranged on the upper surface 631 of the lower plate connecting portion 621, and may also be arranged on both the upper surface 631 and the lower surface 423 of the sleeve flange portion 42. The lower thrust dynamic pressure generating groove array may be provided on at least one of the lower surface of the sleeve portion 4 and the upper surface of the lower plate portion 62 which define the lower thrust gap 73.

The radial dynamic pressure generating groove array may be arranged on the outer circumferential surface of the outer shaft portion 8, may also be arranged on both the outer circumferential surface of the outer shaft portion 8 and the inner circumferential surface of the inner sleeve cylindrical portion 41. The radial dynamic pressure generating groove array may be provided on at least one of the inner circumferential surface of the sleeve portion 4 and the outer circumferential surface of the outer shaft portion 8 which define the radial gap 71. The radial dynamic pressure bearing portion may also be arranged in two portions of the radial gap 71 and the vertical communicating gap 762.

The upper thrust dynamic pressure generating groove array may also be an aggregate of herringbone-shaped grooves. Similarly, the lower thrust dynamic pressure generating groove array may also be an aggregate of herringbone-shaped grooves.

In the above-described preferred embodiments, the upper thrust dynamic pressure bearing portion 72a may not necessarily be provided. In a case where the upper thrust dynamic pressure bearing portion 72a is not provided, a magnetic center of the stator 22 is located lower than that of the rotor magnet 32 in the axial direction such that the bearing mechanism 123 stably supports the rotating portion 122 in the thrust direction.

The bearing mechanism 123 may also be used in an inner rotor type motor in which the rotor magnet is located inside the stator in the radial direction.

The base plate 21 and the lower plate portion 62 may be provided by a single component, such as a single monolithic element, for example. In a case where the base plate 21 and the lower plate portion 62 are provided by a single component, it is possible to reduce component cost or the number of assembling processes.

The configurations in the above-described preferred embodiments and each modification example may be appropriately combined unless they are inconsistent with each other.

Preferred embodiments of the present invention and the modifications thereof can be utilized as a spindle motor of the disk drive apparatus, and may also be utilized as a motor of a device other than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a rotating portion including a rotor magnet; and
   a stationary portion including a stator facing the rotor magnet; wherein
   the stationary portion includes:
      a shaft component centered on a central axis;
      an upper plate portion extending radially outward from an upper portion of the shaft component; and
      a lower plate portion which extends outward from a lower portion of the shaft component in a radial direction thereof;
   the rotating portion includes a sleeve portion disposed between the upper plate portion and the lower plate portion;
   the shaft component includes:
      an inner shaft upper portion;
      an inner shaft lower portion located on a lower side of the inner shaft upper portion; and
      an outer shaft portion having a cylindrical or substantially cylindrical shape and including an inner circumferential surface that is fixed on an outer circumferential surface of the inner shaft upper portion and an outer circumferential surface of the inner shaft lower portion;
   lubricating oil is continuously present within an upper thrust gap between the sleeve portion and the upper plate portion, a radial gap between the sleeve portion and the outer shaft portion, and a lower thrust gap between the sleeve portion and the lower plate portion;
   in a region more radially outward than the radial gap, an upper seal portion is located between the stationary portion and the rotating portion, and an interface of the lubricating oil is located in the upper seal portion;
   in the region more radially outward than the radial gap, a lower seal portion is located between the stationary portion and the rotating portion, and the interface of the lubricating oil is located in the lower seal portion;
   in the lower thrust gap, a lower thrust dynamic pressure generating groove array is arranged on at least one of a lower surface of the sleeve portion and an upper surface of the lower plate portion; and
   in the radial gap, a radial dynamic pressure generating groove array is located on at least one of an inner circumferential surface of the sleeve portion and an outer circumferential surface of the outer shaft portion.

2. The spindle motor according to claim 1, wherein the inner shaft upper portion and the inner shaft lower portion are adhered to the outer shaft portion through an adhesive.

3. The spindle motor according to claim 1, wherein a thermal expansion coefficient of a material of the outer shaft portion is larger than that of a material of the sleeve portion.

4. The spindle motor according to claim 1, wherein the upper plate portion is shaped through press working or forging.

5. The spindle motor according to claim 1, wherein the lower plate portion is shaped through press working or forging.

6. The spindle motor according to claim 1, wherein the inner shaft upper portion and the upper plate portion are defined by a single monolithic member.

7. The spindle motor according to claim 6, wherein the inner shaft lower portion and the lower plate portion are defined by a single monolithic member.

8. The spindle motor according to claim 1, wherein the inner shaft lower portion and the lower plate portion are defined by a single monolithic member.

9. The spindle motor according to claim 1, wherein
   the sleeve portion includes:
      an inner sleeve cylindrical portion into which the outer shaft portion is inserted; and
      a sleeve flange portion which extends radially outward from the inner sleeve cylindrical portion;
   the upper plate portion includes:
      an upper plate cylindrical portion which is located more radially outward than the inner sleeve cylindrical portion, faces an upper surface of the sleeve flange portion, and extends downward from an outer edge of the upper plate portion; and
      an upper plate connecting portion which connects the inner shaft upper portion to an upper portion of the upper plate cylindrical portion in an upper side of the inner sleeve cylindrical portion; and
   the upper seal portion is provided between an outer circumferential surface of the upper plate cylindrical portion and the rotating portion.

10. The spindle motor according to claim 9, wherein
   the sleeve portion further includes an outer sleeve cylindrical portion which faces upward from an outer edge portion of the sleeve flange portion; and
   an upper seal gap in which the upper seal portion is located is provided, wherein the upper seal gap is a gap having a radial width which gradually increases as the gap extends upward between the outer circumferential surface of the upper plate cylindrical portion and an inner circumferential surface of the outer sleeve cylindrical portion.

11. The spindle motor according to claim 9, wherein
   the sleeve portion further includes an outer sleeve cylindrical portion which faces upward from an outer edge portion of the sleeve flange portion;
   the lower plate portion includes:
      a lower plate cylindrical portion; and
      a lower plate connecting portion which connects the inner shaft lower portion to the lower plate cylindrical portion; and
   a lower seal gap in which the lower seal portion is located is provided, wherein the lower seal gap is a gap having a radial width which gradually increases as the gap extends upward between an outer circumferential surface of the outer sleeve cylindrical portion and an inner circumferential surface of the lower plate cylindrical portion.

12. The spindle motor according to claim 9, wherein
a gap is present between a lower end of the inner shaft upper portion and an upper end of the inner shaft lower portion; and
an upper end of the outer shaft portion and a lower surface of the upper plate connecting portion are connected, and a lower end of the outer shaft portion and an upper surface of the lower plate connecting portion are connected.

13. The spindle motor according to claim 12, wherein an adhesive is present in the gap between the lower end of the inner shaft upper portion and the upper end of the inner shaft lower portion.

14. The spindle motor according to claim 1, wherein a gap is present between a lower end of the inner shaft upper portion and an upper end of the inner shaft lower portion.

15. The spindle motor according to claim 14, wherein an adhesive is present in the gap.

16. The spindle motor according to claim 1, wherein a possible existing range of the upper seal portion in an axial direction radially overlaps with an existing range of the radial gap in an axial direction, throughout an entire length of the upper seal portion.

17. The spindle motor according to claim 1, wherein a possible existing range of the lower seal portion in an axial direction radially overlaps with an existing range of the radial gap in an axial direction, throughout nearly an entire length of the lower seal portion.

18. A disk drive apparatus comprising:
a spindle motor arranged to rotate a disk, the spindle motor including:
a rotating portion including a rotor magnet; and
a stationary portion including a stator facing the rotor magnet;
an access portion which performs at least one of reading and writing of information from or to the disk; and
a housing which accommodates the disk, the motor, and the access portion; wherein
the stationary portion includes:
a shaft component centered on a central axis;
an upper plate portion extending radially outward from an upper portion of the shaft component; and
a lower plate portion which extends outward from a lower portion of the shaft component in a radial direction thereof;
the rotating portion includes a sleeve portion disposed between the upper plate portion and the lower plate portion;
the shaft component includes:
an inner shaft upper portion;
an inner shaft lower portion located on a lower side of the inner shaft upper portion; and
an outer shaft portion having a cylindrical or substantially cylindrical shape and including an inner circumferential surface that is fixed on an outer circumferential surface of the inner shaft upper portion and an outer circumferential surface of the inner shaft lower portion;
lubricating oil is continuously present within an upper thrust gap between the sleeve portion and the upper plate portion, a radial gap between the sleeve portion and the outer shaft portion, and a lower thrust gap between the sleeve portion and the lower plate portion;
in a region more radially outward than the radial gap, an upper seal portion is located between the stationary portion and the rotating portion, and an interface of the lubricating oil is located in the upper seal portion;
in the region more radially outward than the radial gap, a lower seal portion is located between the stationary portion and the rotating portion, and the interface of the lubricating oil is located in the lower seal portion;
in the lower thrust gap, a lower thrust dynamic pressure generating groove array is arranged on at least one of a lower surface of the sleeve portion and an upper surface of the lower plate portion; and
in the radial gap, a radial dynamic pressure generating groove array is located on at least one of an inner circumferential surface of the sleeve portion and an outer circumferential surface of the outer shaft portion.

19. The disk drive apparatus according to claim 18, wherein
the inner shaft upper portion includes an upper through hole which passes along the central axis;
the inner shaft lower portion includes a lower female screw portion which passes along the central axis;
a cover portion of the housing includes a cover through hole which overlaps with the upper through hole; and
a cap screw is screw-coupled to the lower female screw portion through the cover through hole and the upper through hole from outside of the housing.

20. The disk drive apparatus according to claim 18, wherein
the inner shaft upper portion includes an upper male screw portion which passes along the central axis;
the inner shaft lower portion includes a lower through hole which passes along the central axis;
a cover portion of the housing includes a cover through hole which overlaps with the lower through hole; and
a cap screw is screw-coupled to the upper male screw portion through the cover through hole from outside of the housing.

* * * * *